United States Patent [19]

Jäger

[11] Patent Number: 4,953,920

[45] Date of Patent: Sep. 4, 1990

[54] REVOLVING, INEXTENSIBLE BAND, PARTICULARLY A TRACK FOR VEHICLES

[75] Inventor: Adreas Jäger, Gehrbergsweg 6, 3167 Burgdorf, Fed. Rep. of Germany

[73] Assignee: Arnold Jäger, Burgdorf, Fed. Rep. of Germany

[21] Appl. No.: 266,711

[22] Filed: Nov. 3, 1988

[30] Foreign Application Priority Data

Nov. 8, 1987 [DE] Fed. Rep. of Germany ....... 3738324
Jul. 14, 1988 [DE] Fed. Rep. of Germany ....... 3823875

[51] Int. Cl.$^5$ .............................................. B62D 55/18
[52] U.S. Cl. .................................. 305/35 EB; 305/39
[58] Field of Search ................. 305/35 R, 35 EB, 37, 305/39, 41, 43, 53, 54, 58 R, 58 PC; 403/151, 157, 161; 24/33 B, 33 P

[56] References Cited

U.S. PATENT DOCUMENTS

| 2,022,567 | 11/1935 | Kegresse | 305/35 EB |
| 2,536,064 | 1/1951 | Knox | 305/38 X |
| 3,161,443 | 12/1964 | Svensson | 305/37 X |
| 3,425,624 | 2/1969 | Jacobs | 305/35 EB X |
| 3,742,557 | 7/1973 | Francois | 24/33 B |
| 4,145,092 | 3/1979 | Kasin | 305/35 EB |
| 4,687,261 | 8/1987 | Atkin | 305/38 X |

FOREIGN PATENT DOCUMENTS

| 2216385 | 10/1972 | Fed. Rep. of Germany | 305/37 |
| 2606096 | 5/1988 | France | 305/39 |
| 209130 | 1/1924 | United Kingdom | 305/35 EB |

Primary Examiner—Russell D. Stormer
Attorney, Agent, or Firm—Robert W. Becker & Associates

[57] ABSTRACT

Provision is made to proceed on the basis of a revolving, inextensible band, especially a track for vehicles, that is made endless via a connecting mechanism, with the outer surface of the band body being provided with ribs, and with the connecting mechanism being disposed between the ribs on the band body. In order to preclude damage to the connecting mechanism during rotation of the band, for example by striking the roadway, in the region of the zone of connection of the band body provision is made for additional projections that project above the connecting mechanism, and preferably have a height that corresponds essentially to that of the ribs.

23 Claims, 2 Drawing Sheets

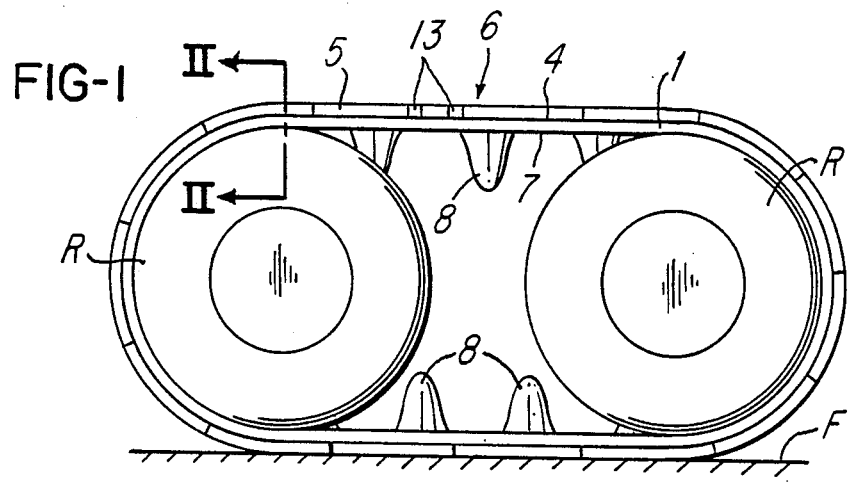
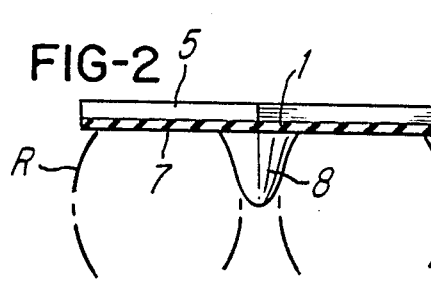
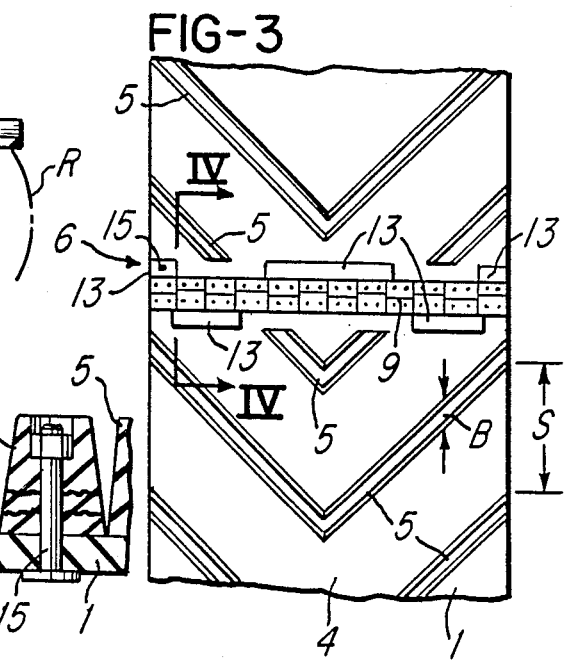
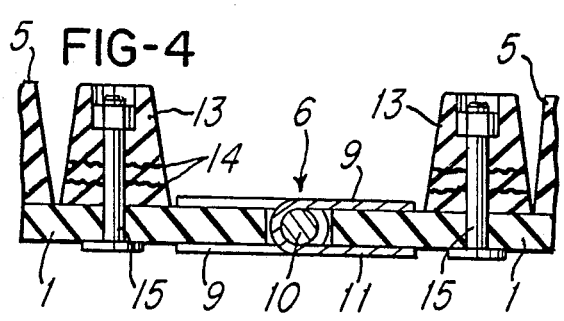
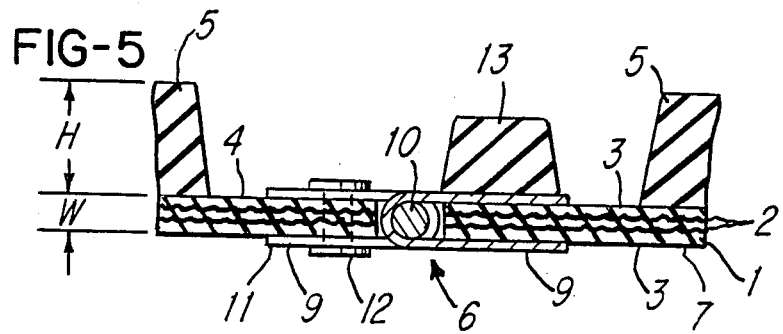

REVOLVING, INEXTENSIBLE BAND, PARTICULARLY A TRACK FOR VEHICLES

BACKGROUND OF THE INVENTION

The present invention relates to a revolving, pull-resistant or inextensible, flexible band, especially a belt or track for vehicles, that is made endless via connecting means, with the outer surface of the band body being provided with blocks, ribs, or similar projections, and with the connecting means being disposed between the ribs.

SUMMARY OF THE INVENTION

In order to be able to achieve an adequately secure connection, these bands are provided at their zones of connection with interengaging connecting means that are made of steel or the like and are, for example, U-shaped; these connecting means are held together by an insertable connecting pin. Whereas the band body, which is made of rubber or the like, and is provided with fabric inserts or the like, is insensitive to mechanical effects, these effects lead to premature wear of the connecting means; this wear could also be produced by foreign bodies, such as grains of sand.

In recognition of these processes, it is an object of the present invention to embody bands of the aforementioned general type in such a way that undesired effects upon the connecting means that occur during operation of the bands are entirely, or at least to a great extent, prevented, in order in this manner to preclude, for example, wear effects.

To realize this object, pursuant to the present invention the band body is provided in the region of the connecting means with additional projections that project from the outer surface of the band body at least as far as do the connecting means, and preferably extend beyond the latter. Expediently, the height of these additional projections should, however, not be greater than the height of the ribs or the like. The projections can be individually secured to the band body, and in particular as close as possible to the connecting means. However, it is also possible to secure the projections directly on the connecting means, for example by adhesion or by vulcanizing them thereto.

These additional projections, during rotation of the bands, for example during rotation of the track, prevent that the connecting means come into contact with the roadway. The additional projections prevent too great of a deformation of the band body in the endangered zone of connection, which is also particularly at risk for the reason that in the zone of connection no ribs or the like are provided and accordingly a comparatively greater deformation of the band body would be possible. However, as a result of the present invention, disadvantageous bending or deformation cannot occur for the reason that such deformation is prevented by the additional projections. These projections form a desired support in the zone of connection and do not allow the connecting means to reach the roadway.

The present invention furthermore proceeds from the recognition that in many applications, especially with tracks for vehicles, it is necessary to individually adapt the bands to the existing diameters and wheel bases, thereby requiring a precise dimensioning and cutting-to-length of the bands. In order under these conditions to be able to mount the bands on location without the need for special devices for securing the eyes and hooks, the present invention strives for a practical solution that enables rapid mounting of the bands.

To realize this object, pursuant to the present invention the connecting means (eyes or hooks) for the transverse rod are secured to a band portion that overlaps the band body and is connected therewith by securing elements, such as bolts, rivets, or the like, that extend through the band body.

This results in the following simplification: one end of the band, and the band portion, in preparatory procedures, for example in a workshop or factory, can be equipped with the eyes or hooks; on location then, after measuring the diameters and wheel bases, it is merely necessary to cut the band body to length and to then connect it in an overlapping manner with the aforementioned band portion, with the bolts or rivets being introduced into holes that can be provided in a simple manner on location, for example via a center punch. After securing the band portion, the band is mounted and finally made endless and ready for operation by introducing the transverse rod.

BRIEF DESCRIPTION OF THE DRAWINGS

Further details of the present invention will be explained in conjunction with the drawings, which illustrate specific embodiments of the invention. In particular:

FIG. 1 is a side view of a track for a vehicle that is provided with dual axles and twin tires, FIG. 2 is a fragmentary cross-sectional view that shows the band of FIG. 1 along the line II—II in FIG. 1, FIG. 3 is a plan view of the track of FIG. 1 showing the zone of connection, FIG. 4 is a partial longitudinal cross-sectional view through the band of FIG. 3 taken along the line IV—IV thereof, and FIG. 5 is a view similar to that of FIG. 4 showing projections that are arranged in a different manner.

DESCRIPTION OF PREFERRED EMBODIMENTS

Figure 6:
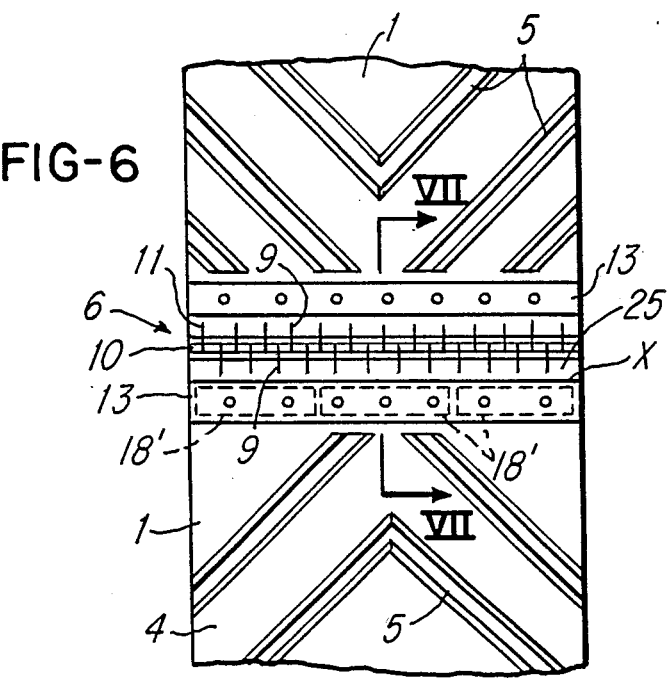
FIG. 6 is a partial plan view of a modified embodiment of the band for the application of FIG. 1 in the region of the zone of connection for the connection of its ends.

The band body 1 comprises rubber or the like, and has a reinforcing insert in the form of a fabric member 2, which is vulcanized in approximately in the middle and is provided above and below with a rubber cover layer 3 (see FIGS. 5 and 7). Securely vulcanized to the outer surface 4 of the band body 1 are V-shaped blocks or ribs 5 that extend over the width of the band; the V of these ribs points in the direction of movement of the band body 1. The individual ribs 5 are telescoped in such a way that, when viewed from the side, they cover or overlap one another. The height H of these ribs 5 is approximately two to three times greater than the thickness W of the band body 1. The cross-sectional shape of the ribs 5 is approximately trapezoidal; these ribs ca also be additionally provided with slits or sipes that increase traction. The rigid ribs 5 establish the contact to the roadway F, which contact is otherwise effected by the tires R.

The band bodies 1 with the ribs 5 are delivered as finite members, are cut to length at the site, and are connected to form endless bands. The point of connection is designated by the reference numeral 6.

In addition, the band body 1 is provided in the central region of its inner surface 7 with approximately sugar loaf-shaped projections 8 that are spaced from one another, extend between the tires R, and laterally guide the band body 1, i.e. prevent a lateral slipping of the band body 1, but also contribute to the transfer of the drive forces from the vehicle wheel to the band body 1.

In order to achieve a decent traction of the track 1, the ribs 5 are spaced relatively far from one another; this spacing or distance S should be approximately three to five times the width B of the ribs 5 (measured in the longitudinal direction of the band).

With such an open profiling, there exists for the point of connection 6 the danger that due to deformations where the band body 1 contacts the ground, the point of connection will come into contact with the roadway F. With the present invention, this is to be avoided entirely or is at least limited to such a great extent that premature damage, especially abrasion, does not occur relative to the connecting means.

These connecting means comprise U-shaped clamps or clips 9 that extend over the end faces of the band ends and interengage one another. The band ends are then held together by a transverse rod 10 t hat is inserted, whereby a hinged connection is provided and the transverse rods 10 can be withdrawn, for example if it is necessary to disassemble the track 1. As shown in FIG. 5, the securement of the legs 11 of the clips 9, for example, can be effected by rivets 12. To protect this detachable connection, which as a rigid metallic member is subjected to greater wear than are the elastic rubber parts (the track 1 with the elastic projections secured thereto), there are provided, as shown in FIG. 4, on both sides of the point of connection 6 additional projections in the form of securely mounted blocks 13 of rubber; the lower portion of each block has a fabric reinforcement 14, and the blocks themselves are securely connected with the band body 1 by one or more bolts 15. These blocks 13, as rigid members, have a height similar to that of the ribs 5, are disposed directly adjacent to the clips 9, and are in addition provided on both sides of the point of connection 6, in other words, the point of connection 6 is sandwiched between these blocks. If during rotation of the band body 1 the point of connection 6 reaches the ground contact area, the point of connection 6 cannot buckle outwardly nor deform at all; thus, the parts and elements that effect the connection do not come into contact with the roadway F, and thereby also cannot suffer wear from direct contact with the roadway F.

In the embodiment illustrated in FIG. 5, the blocks 13 are bonded directly to the clips 9; therefore, at that location the blocks 13 are disposed very close to the transverse rod 10. Accordingly, the blocks 13 can also have a somewhat lesser height, and can generally also be disposed only on one side of the point of connection. Also in this case, the blocks 13 serve to a certain extent as supports for the band body 1 between these spaced-apart ribs 5.

As can be seen from FIG. 3, it is usually sufficient to provide the additional projections only in the regions in which no ribs 5 are disposed. In the region where the rib ends still remain, these ends generally provide a sufficient support. Thus, at that location no special, additional support member is required.

It should also be noted that the present invention is particularly suitable for rib arrangements where the ribs, rather than extending in a transverse direction relative to the band body 1, extend at an angle, for example in a V-shaped manner.

Figure 7:
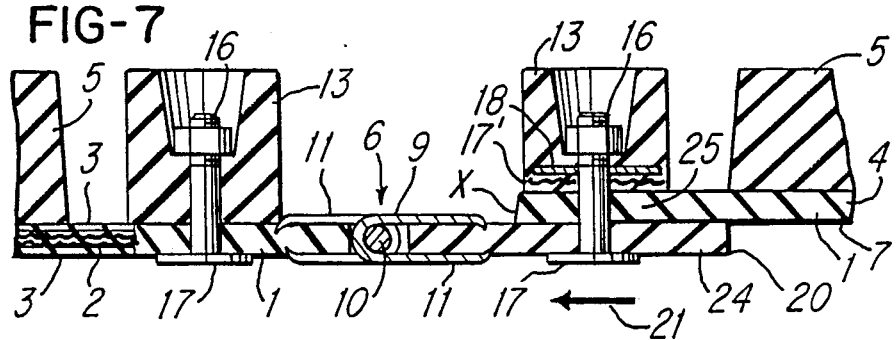
FIG. 7 is a cross-sectional view taken along the line VII—VII in FIG. 6.
Figure 8:
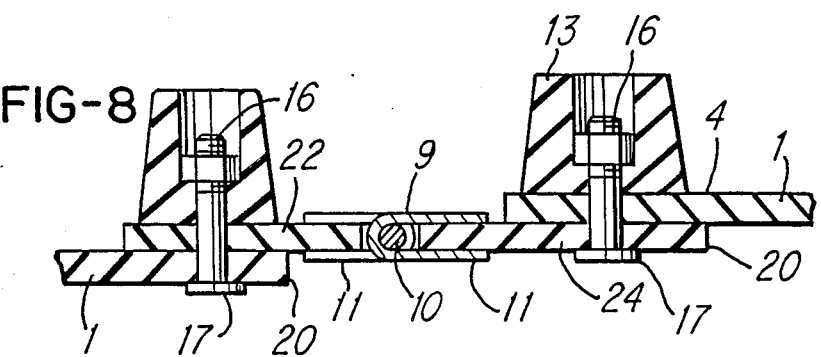
FIG. 8 is a cross-sectional view similar to that of FIG. 7 showing a modification of the zone of connection.

In order in an easy manner to be able to carry out an adaptation of the bands on location, for example in the countryside, to the diameters and clearances of the vehicle undercarriages, and hence to be able to dispense with special devices for mounting eyes and hooks, the proposals of FIGS. 6 to 8 are presented.

A first embodiment for attaining this objective is shown in FIGS. 6 and 7.

Provided at the point of connection 6 are U-shaped clamps or clips 9 that extend over the adjacent end faces of the band and overlap one another. A holding together of the band ends is assured by a transverse rod 10, which could even be flexible, and Which is inserted from one side. In this way a known, hinged connection is established that can again be detached by removing the transverse rod 10. The legs 11 of the clips 9 can be secured in any desired manner, for example by being anchored via angled-off tips. Since a plurality of the clips 9 are provided, and securement thereof is not easy, i.e. requires special tools, pursuant to FIGS. 6 and 7 the clips 9 are secured to only one band end (left side of the connection of FIG. 7), whereas the other, corresponding clips 9 are connected to a band portion 24 that has only a short length, for example approximately 7–15 cm and preferably 10 cm, and that is disposed below the actual band body (band end designated 25) in such a way that the band portion 24 and the band end 25 overlap one another. This overlapping serves for a secure connection via bolts 16 that on the underside have a flat head 17 and that extend through the band portion 24 and the band end 25.

It is also important to provide, on both sides of the point of connection 6, blocks 13 that extend over the width of the band and that thus sandwich between them the point of connection 6 and are intended to prevent the point of connection 6 from striking the roadway during rotation of the band and thereby perhaps experiencing premature wear. In order to assure these effects, the blocks 13 are disposed directly adjacent the clips 9, and could even be disposed on the legs 11.

These blocks 13 are also secured by the bolts 16, and in particular on the left side in the manner described in connection with FIG. 4 by the bolts 16 that are expressly provided for the blocks 3, and on the right side by the bolts 16 that also assure the connection between the band body 1, i.e. the band end 25, and the band portion 24. So that the last-mentioned bolts 16 can effect a good pressure, the base region of the blocks 13 disposed at that location contain at the bottom a fabric reinforcement 17' and thereabove a strip-like metal insert 18 in the form of a flat bar that comprises, however, a plurality of segments 18' that extend over the width of the band in order to increase the flexibility in the transverse direction. It is, of course, to be understood that the nuts of the bolts 16 are disposed in recesses in the blocks 13.

Assembly is effected in a straightforward manner as follows:

To provide a track, the geometric conditions are measured, and thereupon the band body 1 (one end of which is provided with the clips 9) is cut to length at "x", and in particular taking into consideration the length of the band portion 24, which is also delivered in a finished state (similarly provided at the beginning with the clips 9). Thereupon, the holes required for receiving the bolts 16 are provided with the aid of a center punch, whereupon the band portion 24 is bolted to the band end 25. The track is now fitted on and is made into an endless member by introducing the transverse rod 10, in which connection it is expedient that the overlap be disposed in such a way that in the direction of movement of the track (arrow 21), the bottom edge 20 be at the rear.

The invention can similarly also can be used when, despite the presence of the blocks 13, damage occurs to the clips 9. Thus, not only a band portion 24, but also an associated, further band portion 22 as shown in FIG. 8 can be used, whereby here also the edge 20 should be disposed to the rear. Accordingly, with the aid of the additional connecting locations (overlap connection), the hinged connection of the clips 9 and the transverse rod 10 can be completely replaced with the advantage that this replacement could also be accomplished on location, for example in the countryside. For these reasons, the band portions 24, 22 with the clips 9, which extend over the width of the band, can also be carried along as replacement parts. The only other things necessary to establish the connections are the bolts 16 and a center punch.

The band portions 24, 22 expediently have a construction that corresponds to that of the band body 1, namely with the reinforcing inserts 2 or the like.

The present invention is, of course, in no way restricted to the specific disclosure of the specification and drawings, but also encompasses any modifications within the scope of the appended claims.

What I claim is:

1. A revolving, inextensible, flexible band, especially a track for vehicles, that is made endless via connecting means disposed in a zone of connection, with the outer surface of the band body being provided with ribs including first projections distributed with regularity in a uniform distribution over the length of the band in a spacing as to each other greater by a multiple than width thereof, and with said connecting means being disposed between ones of said ribs, said band further comprising:

additional second projections that are disposed non-uniformly distributed on said outer surface of said band body and concentrated particularly in the region of said zone of connection, with said additional second projections projecting from said outer surface of said band body at least as far as do said connecting means, and with said additional second projections, said ribs, and said band body all at least essentially comprising rubber or rubber-like material, said first and second projections precluding wear effects and premature damage, especially abrasion, relative to said connecting means.

2. A band according to claim 1, in which said additional second projections are disposed in locations close to said connecting means and, in order to obtain a decent traction of said track, said ribs including the first projections that are spaced relatively far from one another in a spacing distance in a range of three to five times the width of said ribs as measured in the longitudinal direction of the band.

3. A band according to claim 1, in which said additional projections are, at least in places, fixedly connected to said connecting means.

4. A band according to claim 3, in which said additional projections are disposed on only one side of said zone of connection.

5. A band according to claim 1, in which said additional projections are disposed on said connecting means.

6. A band according to claim 1, in which said additional projections have a height that corresponds at least essentially to the height of said ribs.

7. A band according to claim 1, in which said additional projections extend in the transverse direction of said band body.

8. A band according to claim 1, in which said additional projections are disposed on both sides of said zone of connection.

9. A band according to claim 1, in which said additional projections are embodied as members that are sufficiently rigid under operating pressure.

10. A band according to claim 1, in which said additional projections are detachably mounted, such as by bolts.

11. A band according to claim 1, which includes a first separate band portion to which said connecting means is secured, with said first band portion overlapping said band body and being connected thereto via securing means that extend through said band body.

12. A band according to claim 11, in which said first band portion is disposed on only one side of said zone of connection.

13. A band according to claim 11, which includes a second separate band portion, with one of said band portions being disposed on each side of said zone of connection.

14. A band according to claim 11, in which said securing means also serve to secure additional projections disposed close to said zone of connection.

15. A band according to claim 11, in which said first band portion extends over the width of said band body.

16. A band according to claim 11, in which said first band portion overlaps said band body in such a way that an edge is produced that is disposed on that side of said band body remote from said ribs, with said edge being disposed to a rear end of said first band portion when viewed in the direction of movement of said band body.

17. A band according to claim 11, in which said first band portion has a length that is sufficient only to allow for said overlapping connection using said securing means.

18. A band according to claim 17, in which the length of said first band portion is approximately 7–15 cm.

19. A band according to claim 18, in which the length of said first band portion is approximately 10 cm.

20. A band according to claim 11, in which said additional projections are secured to said band body and said first band portion via bolts that in the case of said first band portion also serve as said securing means therefor.

21. A band according to claim 20, in which said additional projections are provided with a reinforced base portion.

22. A band according to claim 21, in which at least those additional projections secured to said first band portion are provided with flat-bar-like metal inserts through which said securing bolt means extend.

23. A band according to claim 22, which, in the transverse direction of said band, includes a plurality of successively arranged metal insert segments.

* * * * *